United States Patent
Zheng et al.

(10) Patent No.: US 11,909,036 B2
(45) Date of Patent: Feb. 20, 2024

(54) SILICON/CARBON COMPOSITE MATERIAL WITH HIGHLY COMPACT STRUCTURE, METHOD FOR PREPARING SAME, AND USE THEREOF

(71) Applicant: Guangdong Kaijin New Energy Technology Co., Ltd., Dongguan (CN)

(72) Inventors: Anhua Zheng, Guangdong (CN); Dexin Yu, Guangdong (CN); Yongjun Yang, Guangdong (CN)

(73) Assignee: Guangdong Kaijin New Energy Technology Co., Ltd., Dongguan (CN)

( * ) Notice: Subject to any disclaimer, the term of this patent is extended or adjusted under 35 U.S.C. 154(b) by 209 days.

(21) Appl. No.: 17/489,770

(22) Filed: Sep. 29, 2021

(65) Prior Publication Data
US 2022/0320495 A1    Oct. 6, 2022

(30) Foreign Application Priority Data
Apr. 1, 2021    (CN) .......................... 202110355374.5

(51) Int. Cl.
| | |
|---|---|
| *H01M 4/36* | (2006.01) |
| *H01M 4/38* | (2006.01) |
| *H01M 4/583* | (2010.01) |
| *H01M 10/0525* | (2010.01) |
| *H01M 4/02* | (2006.01) |

(52) U.S. Cl.
CPC .......... *H01M 4/366* (2013.01); *H01M 4/386* (2013.01); *H01M 4/583* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2005/0136330 A1* | 6/2005 | Mao | H01M 4/0416 429/231.95 |
| 2016/0211511 A1* | 7/2016 | Ren | H01M 4/386 |

OTHER PUBLICATIONS

Zhang et al., Inorg. Chem. Front., 2020, 7, 2487. (Year: 2020).*

* cited by examiner

*Primary Examiner* — Eli S Mekhlin
(74) *Attorney, Agent, or Firm* — Andrew C. Cheng

(57) ABSTRACT

The present invention relates to the field of anode materials of lithium batteries, and in particular, relates to a silicon/carbon composite material with a highly compact structure. The silicon/carbon composite material with the highly compact structure includes silicon particles and a carbon coating layer, and further includes a highly compact carbon matrix, wherein the silicon particles are distributed inside the highly compact carbon matrix evenly and dispersively and forms an inner core; and the silicon/carbon composite with the highly compact structure is compact inside without voids or has few closed voids inside. The present invention provides the silicon/carbon composite material with the highly compact structure with a reduced volumetric expansion effect and an improved cycle performance, a method for preparing the same, and a use thereof.

11 Claims, 3 Drawing Sheets

SILICON/CARBON COMPOSITE MATERIAL WITH HIGHLY COMPACT STRUCTURE, METHOD FOR PREPARING SAME, AND USE THEREOF

FIELD

The present invention relates to the field of anode materials for lithium batteries, and in particular, relates to a silicon/carbon composite material with a highly compact structure, a method for preparing the same, and a use thereof.

BACKGROUND

Secondary batteries have been widely applied to portable electronic products. With the miniaturization development of portable electronic products and the increasing demands for secondary batteries in the aviation, military, and automotive industries, there is an urgent need for greatly improving the capacity and energy density of batteries. At present, commercial anode materials are mainly graphite materials, which, however due to their low theoretic capacity (372 mAh/g), cannot meet the market needs. In recent years, the attention of people has focused on novel anode materials with a high specific capacity, such as, lithium storage metals (such as Sn and Si) and oxides thereof, as well as lithium transition metal phosphides. Due to its high theoretical specific capacity (4200 mAh/g), Si has become one of the most potential alternatives to graphite materials. However, Si-based materials show huge volume expansion (appr. 300%) during a charge/discharge process, and are likely to undergo cracking and pulverization and lose contact with a current collector, leading to a sharp decrease of a cycle performance.

Current silicon/carbon anode materials are composite materials prepared by granulating nano-silicon, graphite, and carbon. Since nano-silicon is difficult to scatter evenly, it will certainly lead to the local aggregation of nano-silicon. The carbon content at the position with the aggregation of the nano-silicon is relatively low, so that the volume expansion during the cycle process of the nano-silicon cannot be absorbed favorably at that position, and excessive local expansion may be caused at the position with the aggregation of the nano-silicon, which leads to local structural damage which affects the overall performance of the material. Meanwhile, current silicon/carbon anode materials have many pores (20-100 nm) inside, which leads to poor stability of the composite material and increased side reactions caused by direct contacts between the nano-silicon and electrolytes during the cycle process. Therefore, how to increase the scattering evenness of the nano-silicon in the silicon/carbon composite material, to improve the internal compactness of the silicon/carbon composite material, to reduce the volumetric expansion effect, and to improve the cycle performance have great significance in the application of silicon-based material in lithium-ion batteries.

SUMMARY

To solve the technical problems above, the present invention provides a silicon/carbon composite material with a compact structure with a reduced volumetric expansion effect and an improved cycle performance, a method for preparing the same, and a use thereof.

The present invention provides a silicon/carbon composite material with a highly compact structure includes silicon particles and a carbon coating layer, wherein the silicon/carbon composite material with the highly compact structure further includes a highly compact carbon matrix; the silicon particles are distributed inside the highly compact carbon matrix evenly and dispersively and form an inner core; and the silicon/carbon composite with the highly compact structure is compact inside without voids or has few closed voids inside. When the silicon/carbon composite material has few closed voids inside, the ratio of the closed voids to the silicon/carbon composite material in volume is 0-10%.

As a further improvement of the above-mentioned technical solution, the silicon/carbon composite material with the highly compact structure has a true density of 1.90-2.64 $g/m^3$; and the silicon/carbon composite material with the highly compact structure has an oxygen content, a carbon content, and a silicon content which are 0-10%, 20-90%, and 5-90%, respectively.

As a further improvement of the above-mentioned technical solution, the silicon/carbon composite material with the highly compact structure has a porosity of 0-10%, and a particle size $D_{50}$ of 2-30 μm.

As a further improvement of the above-mentioned technical solution, the silicon particles are one or both of nano-silicon or nano-silicon oxide; the nano-silicon has a particle size $D_{50}$ of 1-100 nm, and a grain size of 1-10 nm; and X in the nano-silicon oxide $SiO_x$ is 0-0.8.

As a further improvement of the above-mentioned technical solution, when the silicon/carbon composite material with the highly compact structure has few closed voids inside, the closed voids have an aperture of 3-50 nm.

A method for preparing a silicon/carbon composite material with a highly compact structure includes the following steps:

placing a matrix in a reactor, and depositing silicon particles and a highly compact carbon matrix on the matrix by synchronous or alternate vapor deposition under a protective atmosphere to obtain a precursor A of a compact structure;

separating the prepared precursor A of the compact structure from the matrix, and crushing the precursor A to prepare a precursor B of a silicon/carbon composite material;

performing carbon coating on the precursor B of the silicon/carbon composite material to prepare a precursor C of the silicon/carbon composite material, and sintering the precursor C of the silicon/carbon composite material at high temperature to prepare the silicon/carbon composite material with the highly compact structure.

As a further improvement of the above-mentioned technical solution, the precursor A of the compact structure is one of powder particles or blocks, with a porosity of 0-10%.

As a further improvement of the above-mentioned technical solution, the matrix is one or more of a piece of graphite paper, carbon foam, a metal bar, a metal plate, the silicon/carbon composite material with the highly compact structure prepared with the method, or the precursor B.

As a further improvement of the above-mentioned technical solution, the silicon/carbon composite material with the highly compact structure has an initial reversible capacity being not less than 1800 mAh/g, and after 50 cycles, has an expansion rate being less than 40% and a capacity retention rate being more than 95%.

A use of a silicon/carbon composite material with a highly compact structure is provided, wherein the above-mentioned silicon/carbon composite material with the highly compact structure or a mixture formed by mixing the silicon/carbon composite material with the highly compact structure with carbon powder is used in a lithium-ion battery.

The present invention has the following beneficial effects: the silicon particles according to the present invention are evenly and dispersively distributed inside the highly compact carbon matrix, so that the compact silicon/carbon composite material reduces side reactions by preventing the nano-silicon from directly contacting the electrolytes during the cycle process, thereby improving the cycle performance; the carbon matrix provides a good conductive network capable of effectively releasing/relieving stresses resulting from the volumetric expansion during the charge/discharge process, thereby preventing material cracking and improving the cycle performance of the material; and the silicon particles dispersively distributed inside are ultrafine amorphous nano-silicon particles, which can effectively inhibit the volumetric expansion during the charge/discharge process, reduce material expansion, and improve the cycle performance of the material. The outermost carbon coating layer can effectively reduce side reactions by preventing the nano-silicon from directly contacting the electrolytes, and meanwhile, can further effectively improve the conductivity of the silicon-based material and relieving the volumetric expansion during the charge/discharge process.

DESCRIPTION OF THE EMBODIMENTS

Figure 1:
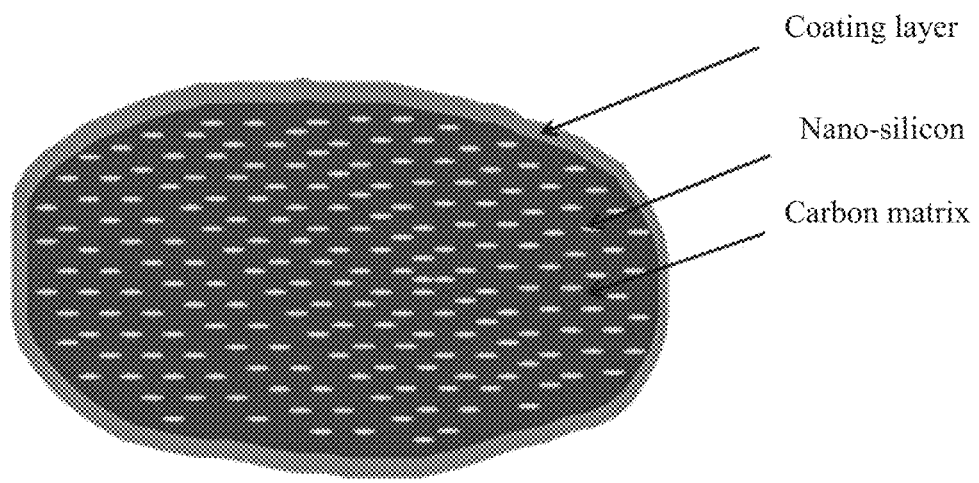
FIG. 1 is a schematic structural diagram of a silicon/carbon composite material with a highly compact structure according to the present invention.

The technical solutions in the embodiments of the present invention will be described clearly and completely below in conjunction with accompanying drawings of the present invention.

A silicon/carbon composite material with a highly compact structure in accordance with an embodiment of the present invention includes silicon particles and a carbon coating layer. The silicon/carbon composite material with the highly compact structure further includes a highly compact carbon matrix and the silicon particles are distributed inside the highly compact carbon matrix evenly and dispersively to form an inner core. The silicon/carbon composite material with the highly compact structure is compact inside without voids or has few closed voids inside.

The silicon particles are formed from a silicon source through pyrolysis, the carbon matrix is formed from an organic carbon source through pyrolysis, and the outermost coating layer is the carbon coating layer, wherein at least one carbon coating layer is provided, with a monolayer thickness of 0.1-3 μm.

The silicon/carbon composite material with a highly compact structure has a true density of 1.90-2.64 g/cm$^3$, further preferably 2.00-2.50 g/cm$^3$, and particularly preferably 2.10-2.50 g/cm$^3$.

The silicon/carbon composite material with a highly compact structure has an oxygen content of 0-10%, further preferably 0-8%, and particularly preferably 0-5%.

The silicon/carbon composite material with a highly compact structure has a carbon content of 20-90%, further preferably 20-60%, and particularly preferably 30-50%.

The silicon/carbon composite material with a highly compact structure has a silicon content of 5-90%, further preferably 20-70%, and particularly preferably 30-60%.

The silicon/carbon composite material with a highly compact structure has a porosity of 0-10%, further preferably 0-5%, and particularly preferably 0-2%, and the silicon/carbon composite material with a highly compact structure has a particle size $D_{50}$ of 2-30 μm, further preferably 2-20 μm, and particularly preferably 2-10 μm.

Further, the silicon/carbon composite material with a highly compact structure has a specific surface area of 0.5-5 m$^2$/g.

The silicon particles are one or both of nano-silicon or nano-silicon oxide, the nano-silicon has a particle size D50 of 1-100 nm, and a grain size of 1-10 nm; and X in the nano-silicon oxide SiO$_x$, is 0-0.8.

Further, the silicon particles are ultrafine amorphous nano-silicon particles.

When the silicon/carbon composite material with a highly compact structure has few closed voids inside, the closed voids have a pore size of 3-50 nm, and the ratio of the closed voids to the silicon/carbon composite material in volume is 0-10%.

A method for preparing a silicon/carbon composite material with a highly compact structure includes the following steps:

placing a matrix in a reactor, and depositing silicon particles and a highly compact carbon matrix on the matrix by synchronous or alternate vapor deposition under a protective atmosphere to obtain a precursor A of a compact structure;

separating the prepared precursor A of the compact structure from the matrix, and crushing the precursor A to prepare a precursor B of a silicon/carbon composite material;

performing carbon coating on the precursor B of the silicon/carbon composite material to prepare a precursor C of the silicon/carbon composite material; and sintering the precursor C of the silicon/carbon composite material at high temperature to obtain the silicon/carbon composite material with the highly compact structure.

The step of synchronous vapor deposition includes: mixing an organic carbon source and a silicon source at a ratio A together with the protective atmosphere, and introducing the mixture into the reactor for vapor deposition.

Further, the alternate vapor deposition is to alternately deposit ultrafine nano-silicon and the carbon matrix, and includes: first, mixing the silicon source with the protective atmosphere at a ratio B and introducing the resultant mixture into the reactor for 1-600 seconds for vapor deposition of the ultrafine nano-silicon, and then, mixing the organic carbon source with the protective atmosphere at a ratio C and introducing the resultant mixture into the reactor for 1-600 seconds for vapor deposition of the carbon matrix, wherein constant alternate introduction is accomplished by an solenoid valve. Alternatively, the alternate vapor deposition comprises: first, mixing the organic carbon source with the protective atmosphere at a ratio C and introducing the resultant mixture into the reactor for 1-600 seconds for vapor deposition of the carbon matrix, and then, mixing the silicon source with the protective atmosphere at a ratio B and introducing the resultant mixture into the reactor for 1-600 seconds for vapor deposition of the ultrafine nano-silicon, wherein constant alternate introduction is accomplished by an solenoid valve.

Further, the ratio A is a flow ratio of 10:1-1:10 between the organic carbon source and the silicon source, the ratio B is a flow ratio of 1.1-1:20 between the silicon source and the protective atmosphere; and the ratio C is a flow ratio of 1:1-1:20 between the organic carbon source and the protective atmosphere.

Further, the organic carbon source and the silicon source are introduced in one or more of the following manners: introducing the two directly or after mixing and diluting the two separately, introducing after passing through a microwave plasma reactor separately, or introducing after passing through the microwave plasma reactor together.

Further, the synchronous or alternate vapor deposition of the nano-silicon and the carbon matrix is performed by introducing the organic carbon source and the silicon source simultaneously or alternately at a rate of 0.5-20.0 L/min at the aforesaid ratio under the protective atmosphere.

Further, the vapor disposition is performed at the temperature of 400-900° C. for a duration of 0.5-20 h.

Further, the protective atmosphere includes one or more of nitrogen, argon, helium, hydrogen, and an argon-hydrogen mixed gas.

Further, the organic carbon source includes one or more of methane, ethane, propane, isopropane, butane, isobutane, ethylene, propylene, acetylene, butene, vinyl chloride, vinyl fluoride, vinyl difluoride, chloroethane, fluoroethane, difluoroethane, chloromethane, fluoromethane, difluoromethane, trifluoromethane, methylamine, formaldehyde, benzene, toluene, xylene, styrene, and phenol.

Further, the silicon source includes one or more of silane, trichlorosilane, silicon tetrachloride, methyltrichlorosilane, methylchlorosilane, chloroethylsilane, dichlorodimethylsilane, dichlorodiethylsilane, methylsilane, dimethylsilane, trimethylsilane, tetramethylsilane, methyldisilane, dimethyldisilane, trimethyldisilane, tetramethyldisilane, and hexamethylsilane.

Further, the crushing processing is one or more of breaking, mechanical crushing, and pneumatic crushing.

Further, the carbon coating includes any one of pyrolyzed carbon coating or vapor-phase carbon coating or liquid-phase carbon coating.

Further, a process of the liquid-phase carbon coating includes: mixing a carbon source, the precursor B to be coated, and a solvent at high speed and dispersing the same evenly to form a slurry; spraying and drying the slurry; and thermally treating the resultant. The carbon source is one or more of sucrose, glucose, citric acid, phenolic resin, epoxy resin, asphalt, polyvinyl alcohol, polypyrrole, polypyrrolidone, polyaniline, polyacrylonitrile, polydopamine, lignin, and chitin.

Further, a process of the vapor-phase carbon coating includes: placing an object to be coated in a reactor; introducing a protective gas into the reactor; increasing the temperature of the reactor to 400-900° C. at a rate of 1-5° C./min; introducing an organic carbon source gas into the reactor at an introduction rate of 0.5-20.0 L/min; preserving heat of the reactor for 0.5-20 h; and naturally cooling the reactor to room temperature to obtain a vapor-phase coating product.

Further, in the process of high-temperature sintering, a temperature rise rate is 1-10° C./min, and heat is preserved at 500-900° C. for 1-10 h.

The precursor A of the compact structure is one of powder particles or blocks, with a porosity of 0-10%, further preferably 0-5%, and particularly preferably 0-2%.

The matrix is one or more of a piece of graphite paper, carbon foam, a metal bar, a metal plate, the silicon/carbon composite material with the highly compact structure prepared with the method, or the precursor B.

The silicon/carbon composite material with the highly compact structure has an initial reversible capacity not less than 1800 mAh/g, and after 50 cycles, has an expansion rate less than 40% and a capacity retention rate more than 95%.

A use of a silicon/carbon composite material with a highly compact structure is provided, where the above-mentioned silicon/carbon composite material with the highly compact structure or a mixture formed by mixing the silicon/carbon composite material with the highly compact structure with carbon powder is used in a lithium-ion battery.

Embodiment 1

1. A matrix of graphite paper was placed in a CVD furnace which is heated to 700° C. at a rate of 5° C./min; high-purity nitrogen, an acetylene gas, and a silane gas were respectively introduced into the CVD furnace at rates of 4.0 L/min, 0.5 L/min, and 0.5 L/min, wherein a duration for introducing the mixed gases was 8 h; and the resultant was naturally cooled to room temperature to obtain a precursor A1.
2. The precursor A1 was separated from the graphite paper and crushed to obtain a precursor B1.
3. 1000 g of the prepared silicon/carbon precursor B1 was placed in the CVD furnace and heated to 700° C. at a rate of 5° C./min; the high-purity nitrogen and the acetylene gas were respectively introduced into the CVD furnace at rates of 4.0 L/min and 0.5 L/min, and a duration for introducing the gases was 4 h; and a resultant was naturally cooled to room temperature to obtain the silicon/carbon composite material.

Embodiment 2

1. A graphite paper matrix was placed in a CVD furnace and heated to 700° C. at a temperature rise rate of 5° C./min; high-purity nitrogen, an acetylene gas, and a silane gas were respectively introduced into the CVD furnace at rates of 4.0 L/min, 2.0 L/min, and 0.5 L/min, wherein a duration for introducing the mixed gases was 8 h; and a resultant was naturally cooled to room temperature to obtain a precursor A2.
2. The precursor A2 was separated from the graphite paper and crushed to prepare a precursor B2.
3. 1000 g of the prepared silicon/carbon precursor B2 was placed in the CVD furnace and heated to 700° C. at a temperature rise rate of 5° C./min; the high-purity nitrogen and the acetylene gas were respectively introduced into the CVD furnace at rates of 4.0 L/min and 0.5 L/min, and a duration for introducing the gases was 4 h; and a resultant was naturally cooled to room temperature to prepare the silicon/carbon composite material.

Embodiment 3

1. 1000 g of the silicon/carbon composite material prepared in Embodiment 1 was placed in the CVD furnace and the CVD furnace is heated to 700° C. at a rate of 5° C./min; high-purity nitrogen, an acetylene gas, and a silane gas were respectively introduced into the CVD furnace at rates of 4.0 L/min, 2.0 L/min, and 0.5 L/min, wherein a duration for introducing the mixed gases was 8 h; and a resultant was naturally cooled to room temperature to obtain a precursor A3.
2. The precursor A3 was crushed to obtain a precursor B3.
3. 1000 g of the prepared silicon/carbon precursor B3 was placed in the CVD furnace and the CVD furnace is heated to 900° C. at a rate of 5° C./min; the high-purity nitrogen and the acetylene gas were respectively introduced into the CVD furnace at rates of 4.0 L/min and 0.5 L/min, and a duration for introducing the gases was 4 h; and a resultant was naturally cooled to room temperature to obtain the silicon/carbon composite material.

Embodiment 4

1. 1000 g of the silicon/carbon composite material prepared in Embodiment 1 was placed in the CVD furnace, and the CVD furnace was heated to 700° C. at a rate of 5° C./min; high-purity nitrogen with a rate of 4.0 L/min, an acetylene gas with a rate of 2.0 L/min and a silane gas with a rate of 0.5 L/min were mixed and introduced into a microwave plasma reactor for ionization; and the ionized gas was introduced into the CVD furnace for vapor deposition for a duration of 8 h, and naturally cooled to room temperature to obtain a precursor A4.
2. The precursor A4 was crushed to obtain a precursor B4.
3. 1000 g of the prepared silicon/carbon precursor B4 was placed in the CVD furnace and the CVD furnace was heated to 700° C. at a rate of 5° C./min; the high-purity nitrogen and the acetylene gas were respectively introduced into the CVD furnace at rates of 4.0 L/min and 0.5 L/min, wherein a duration for introducing the gases was 4 h, and a resultant was naturally cooled to room temperature to obtain the silicon/carbon composite material.

Embodiment 5

1. 1000 g of the silicon/carbon composite material prepared in Embodiment 1 was placed in the CVD furnace, and the CVD furnace was heated to 700° C. at a rate of 5° C./min; high-purity nitrogen with a rate of 4.0 L/min, an acetylene gas with a rate of 2.0 L/min; a silane gas with a rate of 0.5 L/min were introduced into a microwave plasma reactor for ionization; and the three ionized gases were introduced into the CVD furnace for vapor deposition for a duration of 8 h, and naturally cooled to room temperature to obtain a precursor A5.
2. The precursor A5 was crushed to obtain a precursor B5.
3. 1000 g of the prepared silicon/carbon precursor B5 was placed in the CVD furnace and the CVD furnace was heated to 900° C. at a rate of 5° C./min; the high-purity nitrogen and the acetylene gas were respectively introduced into the CVD furnace at rates of 4.0 L/min and 0.5 L/min, wherein a duration for introducing the gases was 4 h; and a resultant was naturally cooled to room temperature to obtain the silicon/carbon composite material.

Embodiment 6

1. 1000 g of the silicon/carbon composite material prepared in Embodiment 1 was placed in the CVD furnace, and the CVD furnace was heated to 700° C. at a rate of 5° C./min; high-purity nitrogen, an acetylene gas, and a silane gas were respectively introduced at rates of 4.0 L/min, 2.0 L/min, and 0.5 L/min; a mixture of the three gases was ionized via the microwave plasma reactor; and the ionized gas was introduced into the CVD furnace for vapor deposition for a duration of 8 h, and naturally cooled to room temperature to obtain a precursor A6.
2. The precursor A6 was crushed to obtain a silicon/carbon composite material.

COMPARATIVE EXAMPLE

1. Micro silicon with a particle size D50 of 3-10 μm and anhydrous ethanol were mixed evenly at a mass ratio of 1:10, and were ball-milled to obtain a nano-silicon slurry with a particle size D50=100 nm;
2. The nano-silicon slurry and flaky graphite were mixed evenly at a mass ratio of 10:1, and then sprayed and granulated to obtain a silicon/carbon precursor 1; and
3. 1000 g of the prepared silicon/carbon precursor 1 was placed in the CVD furnace and heated to 800° C. at a rate of 5° C./min; the high-purity nitrogen and the acetylene gas were respectively introduced into the CVD furnace at rates of 4.0 L/min and 0.5 L/min, wherein a duration for introducing the gases was 4 h; and a resultant was naturally cooled to room temperature to obtain the silicon/carbon composite material.

The embodiments and comparative example described above will be tested as below.

Test conditions: the materials prepared in the comparative example and the embodiments were taken as anode materials and mixed with a binder of polyvinylidene fluoride (PVDF) and a conductive agent (Super-P) at a mass ratio of 70:15.15; a proper amount of N-methylpyrrolidone (NMP) was added as a solvent to prepare a slurry which was coated on a copper foil; the coated copper foil was vacuum dried and rolled to obtain an anode piece; a metal lithium piece was used as a counter electrode, electrolytes obtained by using 1 mol/L of LiPF6 three-component mixed solvent at a mixing ratio of EC:DMC:EMC=1:1:1(v/v) was used, and a polypropylene microporous membrane was used as a separator diaphragm, and a CR2032 type button battery was assembled in a glove box filled with an inert gas. A charge/discharge test of the button battery was performed on a battery test system in Landian Electronics (Wuhan) Co., Ltd, the charge/discharge occurred at 0.1 C at room temperature, and a charge/discharge voltage limited to 0.005-1.5 V.

A method for testing and calculating a volumetric expansion rate of the material was as follows: a composite material with a capacity of 500 mAh/g was prepared by compounding the prepared silicon/carbon composite material and graphite, and then the cycle performance of the composite material was tested, wherein an expansion rate=(pole piece thickness after 50 cycles−pole piece thickness before cycles)/(pole piece thickness before cycles−copper foil thickness)*100%.

Table 1 shows the results of initial-cycle tests of the comparative example and Embodiments 1 to 6.

|  | Initial charge specific capacity (mAh/g) | Initial discharge specific capacity (mAh/g) | Initial coulombic efficiency (%) |
| --- | --- | --- | --- |
| Comparative Example | 2377.2 | 1930.3 | 81.2 |
| Embodiment 1 | 2143.9 | 1938.1 | 90.4 |
| Embodiment 2 | 1997.1 | 1845.3 | 92.4 |
| Embodiment 3 | 1936.3 | 1810.4 | 93.5 |
| Embodiment 4 | 2153.1 | 1967.9 | 91.4 |
| Embodiment 5 | 1993.4 | 1879.8 | 94.3 |
| Embodiment 6 | 2192.6 | 2043.5 | 93.2 |

Table 2 shows the results of cyclic expansion tests the comparative example and Embodiments 1 to 6.

|  | Initial discharge specific capacity (mAh/g) | 50-cycle expansion rate (%) | 50-cycle capacity retention rate (%) |
| --- | --- | --- | --- |
| Comparative Example | 500.1 | 55.0 | 74.2 |
| Embodiment 1 | 500.3 | 39.4 | 95.4 |
| Embodiment 2 | 500.2 | 36.7 | 96.2 |
| Embodiment 3 | 500.5 | 37.6 | 95.7 |
| Embodiment 4 | 500.1 | 36.5 | 96.3 |
| Embodiment 5 | 500.3 | 35.6 | 96.7 |
| Embodiment 6 | 500.6 | 38.7 | 95.3 |

FIG. 1 shows a schematic structural diagram of the silicon/carbon composite material with the highly compact structure according to the present invention. From FIG. 1, it can be seen that the silicon particles are distributed evenly and dispersively inside the highly compact carbon matrix, so that the compact silicon/carbon composite material prevents the nano-silicon from directly contacting the electrolytes during the cycle process to thereby reduce side reactions and improve the cycle performance. The carbon matrix provides a good conductive network capable of effectively releasing/relieving stresses resulting from the volumetric expansion during the charge/discharge process, thereby preventing material cracking and improving the cycle performance of the material. The silicon particles distributed dispersively inside are ultrafine amorphous nano-silicon particles, which can effectively inhibit volumetric expansion during the charge/discharge process, reduce material expansion, and improve the cycle performance of the material. The outermost carbon coating layer can effectively reduce side reactions by preventing the nano-silicon from directly contacting the electrolytes, and meanwhile, can further effectively improve the conductivity of the silicon-based material and relieve the volumetric expansion during the charge/discharge process.

Figure 2:
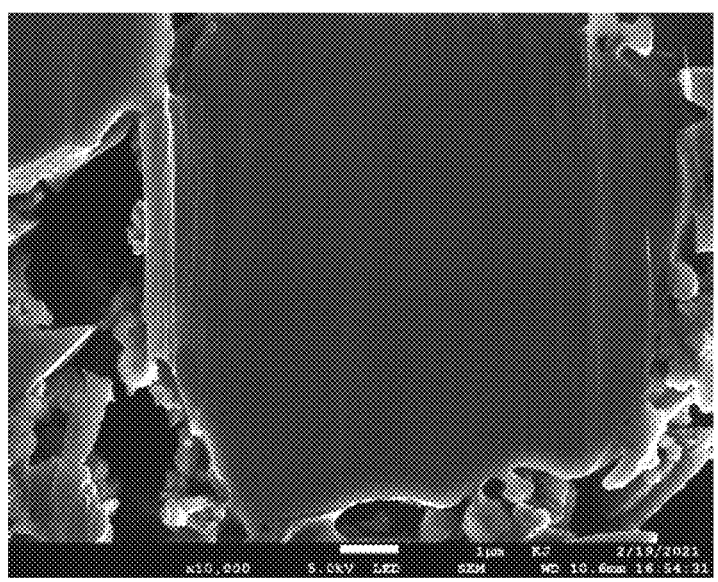
FIG. 2 is a first schematic diagram showing the FIB-SEM of a silicon/carbon composite material with a highly compact structure according to Embodiment 4 of the present invention.
Figure 3:
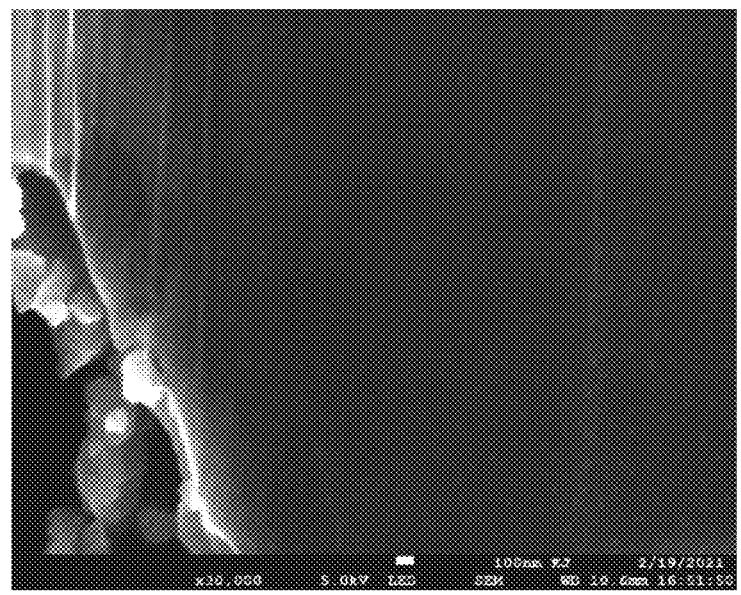
FIG. 3 is a second schematic diagram showing the FIB-SEM of the silicon/carbon composite material with the highly compact structure according to Embodiment 4 of the present invention.

FIG. 2 and FIG. 3 are schematic diagrams of FIB-SEM of Embodiment 4. From FIG. 2 and FIG. 3, it can be seen that the particles inside the material are ultrafine nano-silicon, the rest of the material is the carbon matrix, the interior of the material is free of voids and the compactness is high; and meanwhile, the ultrafine nano-silicon is evenly scattered in the carbon matrix.

Figure 4:
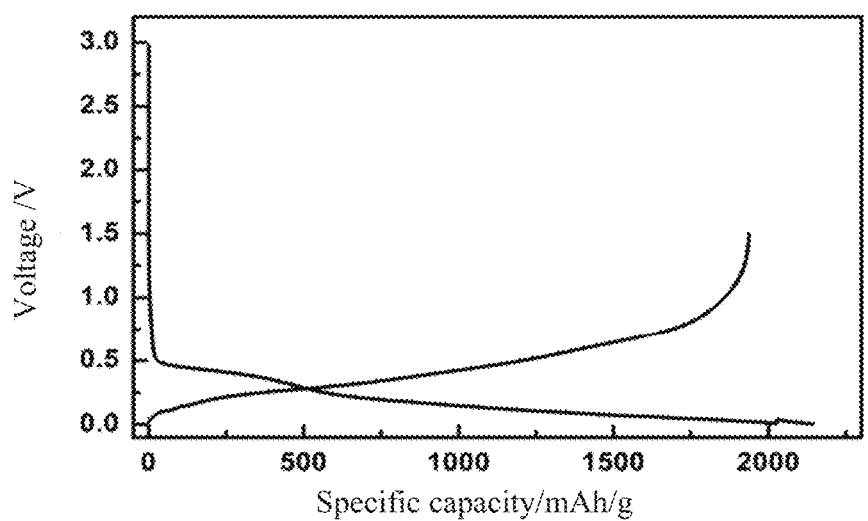
FIG. 4 shows initial charge/discharge curves of a sample of the silicon/carbon composite material with the highly compact structure according to the present invention.

FIG. 4 shows an initial charge/discharge curve of a sample according to the present invention. From FIG. 4, it can be seen that the sample has a capacity of 1938.1 mAh/g with an efficiency of 90.4%. In combination with Tables 1 to 2, the sample according to the present invention shows the characteristics of high capacity, high initial efficiency, and the like.

Figure 5:
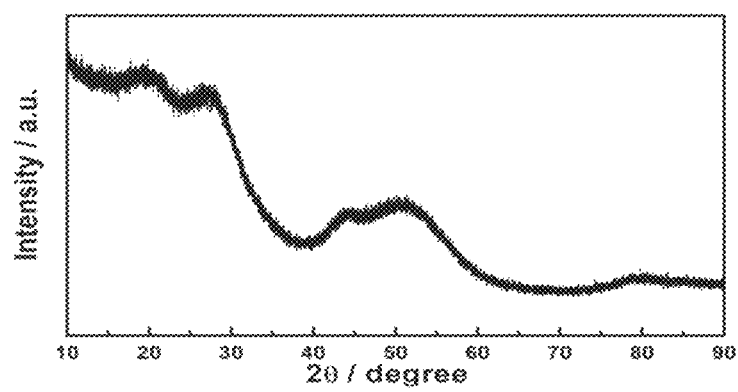
FIG. 5 is an XRD pattern of a sample of the silicon/carbon composite material with the highly compact structure according to the present invention.

FIG. 5 shows an XRD pattern of a sample according to the present invention. From FIG. 5, it can be seen that the silicon in the sample is in an amorphous state and is dispersively distributed in the carbon matrix.

The embodiments above only provide specific and detailed descriptions of several implementations of the present invention, and therefore should not be construed to limit the patent scope of the present invention. It should be noted that several variations and improvements can be made by those of ordinary skills in the art without departing from the concept of the present invention, and shall be construed as falling within the protection scope of the present invention. Therefore, the patent protection scope of the present invention shall be subjected to the accompanying claims.

What is claimed is:

1. A silicon/carbon composite material with a compact structure, comprising an inner core and a carbon coating layer coated on the inner core, wherein the inner core comprises a compact carbon matrix and silicon particles distributed inside the compact carbon matrix evenly and dispersively, and the silicon/carbon composite material is compact inside without voids or has closed voids therein with a volume ratio of 0-10%;
wherein the silicon/carbon composite material has a true density of 1.90-2.64 g/cm$^3$, and has an oxygen content of 0-10%, a carbon content of 20-90% and a silicon content of 5-90%.

2. The silicon/carbon composite material according to claim 1, wherein the silicon/carbon composite material has a porosity of 0-10%, and a particle size $D_{50}$, of 2-30 μm.

3. The silicon/carbon composite material according to claim 1, wherein the silicon particles are one or both of nano-silicon and nano-silicon oxide (SiOx), the nano-silicon has a particle size $D_{50}$ of 1-100 nm, and a grain size of 1-10 nm; and X in the SiOx is 0-0.8.

4. The silicon/carbon composite material according to claim 1, wherein when the silicon/carbon composite material has closed voids inside, the closed voids have a pore size of 3-50 nm.

5. A method for preparing a silicon/carbon composite material with a compact structure according to claim 1, comprising:
placing a matrix in a reactor, and depositing silicon particles and a compact carbon matrix on the matrix by synchronous or alternate vapor deposition under a protective atmosphere to obtain a precursor A of a compact structure;
separating the precursor A from the matrix, and crushing the precursor A to obtain a silicon/carbon composite material precursor B;
performing carbon coating on the silicon carbon composite material precursor B to obtain a silicon/carbon composite material precursor C; and
sintering the silicon/carbon composite material precursor C at high temperature to obtain the silicon/carbon composite material with the compact structure.

6. The method for preparing the silicon/carbon composite material according to claim 5, wherein the precursor A of the compact structure is powder particles or blocks, and has a porosity of 0-10%.

7. The method for preparing the silicon/carbon composite material according to claim 5, wherein the matrix is one or more of a piece of graphite paper, carbon foam, a metal bar, a metal plate, the silicon/carbon composite material with the compact structure prepared with the method, and the precursor B.

8. The method for preparing the silicon/carbon composite material according to claim 5, wherein the silicon/carbon composite material with the compact structure has an initial reversible capacity not less than 1800 mAh/g, and has an expansion rate less than 40% and a capacity retention rate more than 95% after 50 cycles.

9. A silicon/carbon composite material with a compact structure, comprising an inner core and a carbon coating layer coated on the inner core, wherein the inner core comprises a compact carbon matrix and silicon particles distributed inside the compact carbon matrix evenly and dispersively, and the silicon/carbon composite material is compact inside without voids or has closed voids therein with a volume ratio of 0-10%;

wherein the silicon particles are one or both of nano-silicon and nano-silicon oxide (SiOx), the nano-silicon has a particle size $D_{50}$ of 1-100 nm, and a grain size of 1-10 nm; and X in the SiOx is 0-0.8.

10. The silicon/carbon composite material according to claim 9, wherein the silicon/carbon composite material has a porosity of 0-10%, and a particle size $D_{50}$ of 2-30 μm.

11. The silicon/carbon composite material according to claim 9, wherein when the silicon carbon composite material has closed voids inside, the closed voids have a pore size of 3-50 nm.

* * * * *